United States Patent [19]

Kashio

[11] 3,771,133

[45] Nov. 6, 1973

[54] MEMORY DEVICE HAVING MAIN SHIFT REGISTER AND SUPPLEMENTARY SHIFT REGISTER

[75] Inventor: Toshio Kashio, Higashi, Yamato-shi, Tokyo, Japan

[73] Assignee: Casio Computer Co., Ltd., Tokyo, Japan

[22] Filed: Sept. 6, 1972

[21] Appl. No.: 286,845

[30] Foreign Application Priority Data

Sept. 11, 1971 Japan ............................... 46/70585

[52] U.S. Cl. ............................................ 340/172.5

[51] Int. Cl. ............................................ G11c 19/00

[58] Field of Search .................................. 340/172.5

[56] References Cited

UNITED STATES PATENTS

| | | | |
|---|---|---|---|
| 3,571,808 | 2/1971 | Washizuka et al. | 340/172.5 |
| 3,351,917 | 11/1967 | Shimabukuro | 340/172.5 |
| 3,504,353 | 3/1970 | Guzak, Jr. | 340/172.5 |
| 3,478,325 | 11/1969 | Oeters et al. | 340/172.5 |
| 3,593,298 | 7/1971 | Armstrong | 340/172.5 |
| 3,274,566 | 9/1966 | McGrogan, Jr. | 340/172.5 |
| 3,388,383 | 6/1968 | Shivdasani et al. | 340/172.5 |
| 3,646,526 | 2/1972 | Fagan et al. | 340/172.5 X |
| 3,387,283 | 6/1968 | Snedaker | 340/172.5 |

*Primary Examiner*—Gareth D. Shaw
*Assistant Examiner*—Paul R. Woods
*Attorney*—Robert D. Flynn et al.

[57] ABSTRACT

A memory device including a buffer register for storing input data and a main shift register having addresses arranged in series so as to store input data supplied from said buffer register in a specified address, wherein, in case input data being stored in the main register has more digits than those initially designed for the prescribed address of the main shift register, there is serially connected to the main shift register a supplementary shift register capable of handling numerous digits so as to store said excess digits as a temporary extension of the capacity of the main shift register. There is formed a path of circulatory shifting between the input section of the main shift register and the position of the least significant digit which is detected by detecting means to have flowed over to said supplementary shift register when the specified address of the main shift register is fully filled with inputs from the buffer register and there is connected between the main shift register and supplementary shift register means for disconnecting the supplementary shift register from the main shift register at the beginning of cycle of circulatory shifting in said main shift register.

4 Claims, 1 Drawing Figure

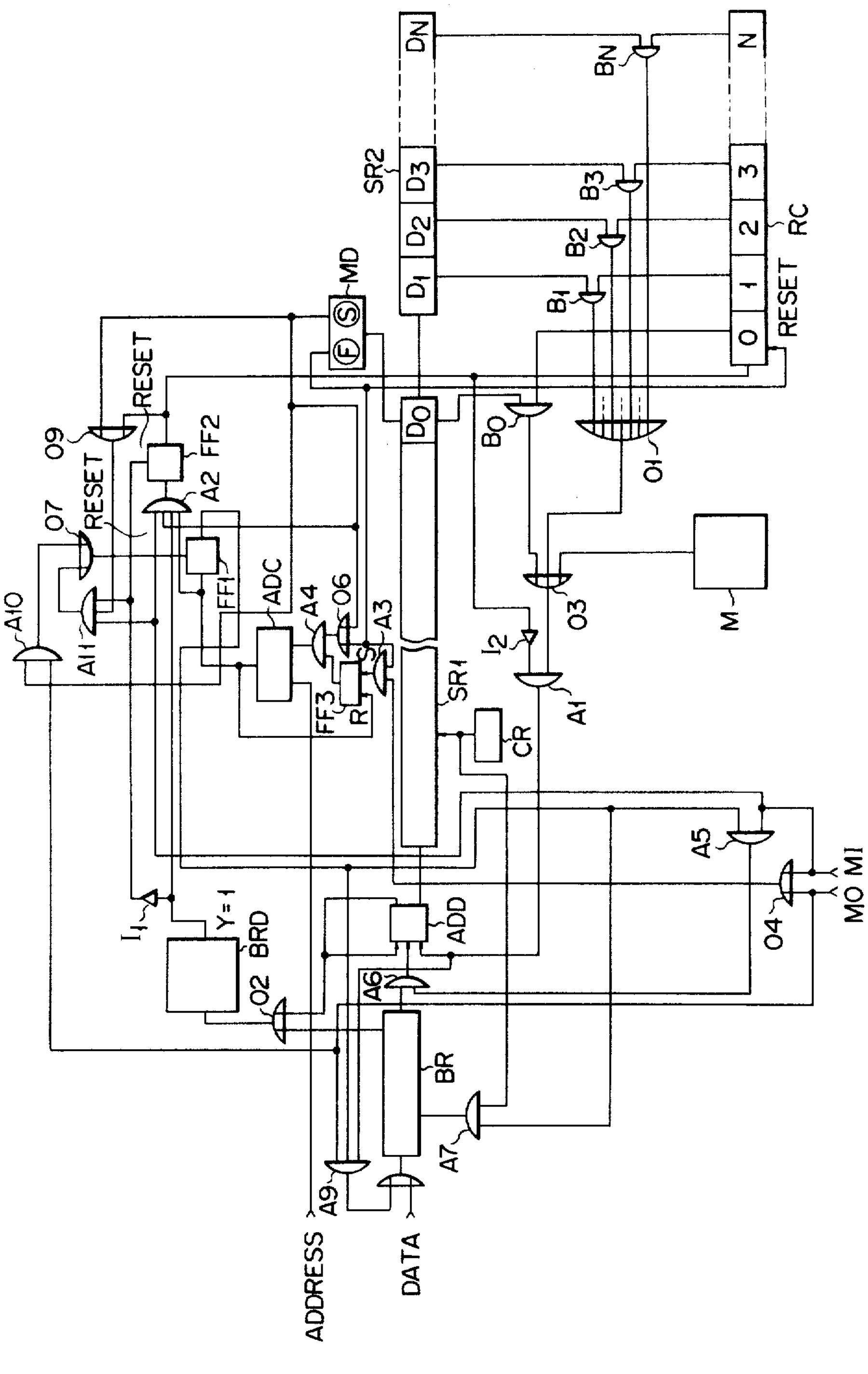
SR2
D1
D2
D3
DN
D0
MD
RC
RESET
BN
B3
B2
B1
B0
O1
O3
M
I2
A1
SR1
CR
A5
O4
MO MI
ADD
A6
BR
A7
A9
ADDRESS
DATA
O2
BRD
Y=1
I1
A10
A11
O7
O9
FF2
A2
FF1
ADC
A4
O6
A3
FF3
S
R

MEMORY DEVICE HAVING MAIN SHIFT REGISTER AND SUPPLEMENTARY SHIFT REGISTER

This invention relates to a memory device capable of effectively utilizing the capacity of a shift register by its temporary extension.

Memory devices known to date include a dynamic type for storing data while keeping it successively shifted and a static type capable of suitably shifting data upon receipt of instructions, though said data may be kept at rest up to that point. With these prior art memory devices, the numbers of characters or digits of data being stored are projected in advance and storing is effected by allotting particular characters or digits to the specified addresses. To effect a storing operation smoothly, therefore, the conventional memory device should be designed with full allowance for the numbers of characters or digits being recorded. In fact, however, the prior memory device has failed to utilize most effectively the prescribed address of a shift register which is to be stored with the originally designed number of characters. Namely, part of the address sometimes is left unused.

It is accordingly the object of this invention to provide a memory device free from the above-mentioned drawbacks which is provided with a shift register unit capable of handling varying numbers of characters or digits by controlling the storing capacity of the specified address according to the number of characters or digits included in data being stored, thereby effectively utilizing the storing capacity of the shift register unit without occurrence of unused portions in the specified address.

SUMMARY OF THE INVENTION

To attain the aforesaid object, the memory device of this invention has a supplementary shift register capable of handling numerous characters or digits which is serially connected to a main shift register having addresses arranged in series. Where an input data from a buffer register has more digits than those initially designed for the prescribed address of the main shift register, the supplementary shift register temporarily stores said overflowing digits. When the prescribed address of the main shift register is fully stored with data from the buffer register, said overflowing digits conducted to the supplementary shift register are detected by detecting means and the resultant detection signal is fed back to the input terminal of the main shift register through a path of circulatory shifting. The supplementary shift register is disconnected from the main shift register at the beginning of each cycle of circulatory shifting in the main shift register, thereby providing a shift register unit capable of handling varying numbers of characters or digits with its storing capacity suitably controlled.

Accordingly, the shift register unit of this invention does not require the storing capacity of a prescribed address to be defined in advance according to the number of the characters or digits of data being stored, as is the case with the prior art memory device. Namely, this invention enables the storing capacity of the addresses included in the shift register unit to be freely increased as needed, thus prominently elevating its storing efficiency by effective utilization of its initially set storing capacity.

The appended drawing is a circuit diagram of the memory device of this invention.

There will now be described this invention by reference to the appended drawing. Notation $SR_1$ denotes a main shift register which is a dynamic type designed to store digits in series and in consequence having digit addresses arranged in series (said arrangement comprises, for example, 4 bits). To said main shift register $SR_1$ is serially connected a supplementary shift register $SR_2$ which is formed of a dynamic shift register actuated in synchronization with the main shift register $SR_1$. Said supplementary shift register $SR_2$ has a capacity of storing digits $D_1$ to $D_n$ (a maximum word length of, for example, 12 digits), and is so designed as to successively store data shifted from the position of the digit $D_0$ of the final output section of the main shift register $SR_1$. To the position of the digit $D_0$ of the final output section of the main register $SR_1$ is connected a mark signal detecting circuit MD for detecting a start code F and a space code S and generating an output signal of "1" from the F or S output terminal thereof according to the type of code detected. There is provided a ring counter with count numbers 0, 1, 2, . . . *n* so set as to correspond to the digit $D_0$ of the final output section of the main shift register $SR_1$ and the digits $D_1$ to $D_n$ of the supplementary shift register $SR_2$ respectively. One of AND circuits $B_0$ to $B_n$ is opened according to the number of counts made by the ring counter RC to feed back a signal associated with the corresponding digit of the supplementary shift register $SR_2$ through an OR circuit 01, 03 and AND circuit $A_1$ to the input section of the main shift register $SR_1$, thus forming a path of circulatory shifting. This path of circulatory shifting can also be provided by an *n*-value counter fitted with a decoder. In the case of said *n*-value counter, the input section of the main shift register $SR_1$ is provided with an adder ADD, which is supplied with data from a buffer register BR. This buffer register BR is designed to temporarily store circulating data and input data, and comprises, for example, a static type, which, upon receipt of instructions, causes data stored therein to be shifted, producing an output signal. An output signal from said buffer register BR and a carry signal from said adder ADD are supplied through an OR circuit $O_2$ to an input value detecting circuit BRD. This detecting circuit BRD produces an output signal of "1" while the buffer register contains data being delivered to the main shift register $SR_1$, thereby judging whether the final digit still remains stored in the buffer register BR. Said detecting circuit BRD may be a type designed to count the number of digits included in a given number. Further, an address for storing data is specified by an address signal which, in turn, is counted by an address counter ADC. Said address counter ADC counts the number of an address being specified and later counts down in succession, each time the prescribed address of the main shift register $SR_1$ advances by being shifted. Upon completion of counting required to specify an address, said address counter ADC produces an output signal of "1."

With the aforementioned type of memory device, there are recorded in the main shift register $SR_1$ the marks indicated in Table 1 below by a mark signal generating circuit M.

TABLE 1.—MARKS RECORDED IN THE MAIN SHIFT REGISTER

| t | Operation | BR | $SR_1$ | $D_0$ | $D_1$ | $D_2$ | $D_3$ | $D_4$ | RC | ADC | $F/F_1$ | $F/F_2$ | Y=1 |
|---|---|---|---|---|---|---|---|---|---|---|---|---|---|
| | Writing of marks | | SS....SSS | F | | | | | 0 | 0 | 0 | 0 | 0 |
| | Instruction for writing (to write 365 in the address 1) | 365 | SS...F..SS | S | | | | | 0 | 1 | 0 | 0 | 1 |
| 1 | | 365 | SS......SS | F | | | | | 0 | 1 | 0 | 0 | 1 |
| 2 | Setting of address counter at 0 | 365 | FS......SS | S | | | | | 0 | 0 | 0 | 0 | 1 |
| 3 | $(F/F_1F/F_2)=1$ | 36 | 5FS.....SS | S | S | | | | 1 | 0 | 1 | 1 | 1 |
| 4 | | 3 | 65FS....SS | S | S | S | | | 2 | 0 | 1 | 1 | 1 |
| 5 | Y=0 | | 365FS...SS | S | S | S | S | | 3 | 0 | 1 | 1 | 0 |
| 6 | Completion of writing | | S365FS..SS | S | S | S | S | | 3 | 0 | 0 | 0 | 0 |
| | | | SS....SS365 | F | S | S | S | | 3 | 0 | 0 | 0 | 0 |
| | Resetting of ring counter | | FS....SS36 | 5 | | | | | 0 | 0 | 0 | 0 | 0 |
| | Instruction for writing (to write 1971 in the address 3) | 1971 | SS....S365F | S | | | | | 0 | 3 | 0 | 0 | 1 |
| | Instruction for read-out (to read the data of the address 1) | | SS..SS365F | S | | | | | 0 | 1 | 0 | | |
| 1 | | | SS....SS365 | F | | | | | | 1 | 0 | | |
| 2 | Setting of address counter at 0 | | F........36 | 5 | | | | | | 0 | 0 | | |
| 3 | | 5 | 5F......SS3 | 6 | | | | | | 0 | 1 | | |
| 4 | | 65 | 65F......SS | 3 | | | | | | 0 | 1 | | |
| 5 | | 365 | 365FS.....S | S | | | | | | 0 | 1 | | |
| 6 | Completion of readout | | S365F...SS | S | | | | | | 0 | 0 | | |
| | | 365 | S..SS365FS | S | | | | | | 0 | 0 | | |

The mark signal generating circuit M records first a start code F and then a space code S delivered from the initial section of each cycle of circulatory shifting in the main shift register $SR_1$. In this case, the gate terminal of an AND circuit $A_1$ provided in a path for transmitting signals from the mark signal generating circuit M is kept in a state of "1" by an output from the mark signal generating circuit M. Under this condition, there are received neither writing instructions nor input data. The input value detecting circuit BRD associated with the buffer register BR produces an output of "0," and the reset terminal of a flip-flop circuit $FF_2$ is supplied with a signal of "1" through a NOT circuit $I_1$. A "0" output from said flip-flop circuit $FF_2$ is converted to a signal of "1" through a NOT circuit $I_2$ to be supplied to the AND circuit $A_1$. At this time, signals representing the start code F and space code S which are supplied from the mark signal generating circuit M pass through an OR circuit $0_3$, the opened AND circuit $A_1$ and adder ADD and are stored in the main shift register $SR_1$, which is actuated at this time by clock pulses from a clock pulse generator CR. When the start code F is brought to the position of the digit $D_0$ of the final output section of the main shift register $SR_1$, the mark signal detecting circuit MD detects said start code F, the resultant detection signal resetting the ring counter RC. Accordingly, an AND circuit BO is opened to cause the recorded start code F to be subjected to circulatory shifting through the OR circuit $O_3$, AND circuit $A_1$ and adder ADD.

Where, under this condition, there are given instructions to record data 365 in the address 1, then said data 365 is first recorded in the buffer register BR. At this time, the address counter ADC counts 1 as an address signal. Accordingly, the input value detecting circuit BRD detects the value of said data delivered from the buffer register BR, and generates a signal of $Y=1$, which in turn is conducted to an AND circuit $A_2$. Where, under this condition, there is received a signal denoting writing instructions $M_1$, said signal is supplied to an AND circuit $A_3$ through an OR circuit $O_4$. At this time, the start code F recorded in the main shift register $SR_1$ is already subjected to circulatory shifting. When, therefore, said start code F reaches the position of the digit $D_0$ of the final output section of the main shift register $SR_1$, the mark signal detecting circuit MD detects said start code F. The resultant detection output opens the gate of the AND circuit $A_3$ and resets a flip-flop circuit $FF_3$, causing a signal of writing instructions MI to be supplied to an AND circuit $A_4$. Said AND circuit $A_4$ is supplied with a gate signal through an OR circuit $O_6$ upon receipt of output signals derived from detection of the marks F and S by the mark signal detecting circuit MD. The aforesaid signal of writing instructions MI so acts as to cause the address counter ADC to count down. Namely, each time there takes place one shift in the main shift register $SR_1$, the address counter ADC ccounts down by one. In this case, the address counter counts 1 to specify the address 1. When, therefore, the start code F is brought to the position of the digit $D_0$ of the final output section of the main shift register $SR_1$, and then shifted back to the input section thereof, then the address counter ADC counts 0. Accordingly, the output signal of "1" from said address counter ADC resets the flip-flop circuit $FF_3$, resulting in the state indicated under the item of $t=2$ in the aforesaid Table 1.

Where the address counter counts down to 0, it produces an output signal of "1." This signal of "1" is supplied to the flip-flop circuit $FF_1$ to set it and also to the AND circuit $A_2$ as a gate signal. As the result, the flip-flop circuit $FF_1$ produces an output signal of "1," and the AND circuit $A_2$ is supplied with the aforesaid signal of $Y=1$ and a signal derived from detection of the space code S by the mark signal detecting circuit MD. At this time, the flip-flop circuit $FF_2$ is also set to produce an output signal of "1." An output signal of "1" from the flip-flop circuit $FF_1$ opens an AND circuit $A_5$, which in turn produces an output signal of "1" to open an AND circuit $A_6$. Accordingly, the least significant digit 5 stored in the buffer register BR is brought to the input section of the main shift register $SR_1$ through the adder ADD, presenting the state shown under the item of $t=3$ in Table 1. At this time, the main register $SR_1$ has no more space to store said digit 5. However, this digit 5 overflows to the position of the digit $D_1$ of the supplementary shift register $SR_2$ to be stored therein. Clock pulses from the clock pulse generator CR are supplied to an AND circuit $A_7$ together with an output signal from the flip-flop circuit $FF_1$, causing the buffer register BR to effect shifting upon receipt of instructions. At this time, the ring counter RC counts 1 upon receipt of an output signal from the flip-flop circuit $FF_2$ to open the AND circuit $B_1$, and the AND circuit $A_1$ remains closed, preventing the occurrence of circulatory shifting.

Later when the clock pulse generator CR delivers clock pulses, data recorded in the buffer register BR is conducted to the main shift register $SR_1$ as shown under the items of $t$=4 and $t$=5 in Table 1, and the space code S forced out of the main register $SR_1$ is recorded in the supplementary shift register $SR_2$ up to the position of the digit $D_3$, causing the ring counter RC to count 3. When data stored in the buffer register BR is fully brought into the main shift register $SR_1$, the input value detecting circuit BRD produces an output of $Y$=0 to close the gate of the AND circuit $A_2$, thereby resetting the flip-flop circuit $FF_2$ through the NOT circuit $I_1$ as well as the flip-flop circuit $FF_1$ through an AND circuit $A_{11}$ and an OR circuit $O_7$. As a result, the AND circuit $A_1$ is opened to cause the position of the digit $D_3$ of the supplementary shift register $SR_2$ to be connected to the input section of the main shift register $SR_1$ through the AND circuit $B_3$ which is opened when the ring counter RC counts 3, as well as through the adder ADD, thus giving rise to circulatory shifting and completing the writing of data. Where the start code F is brought to the position of the digit $D_0$ of the final output section of the main shift register $SR_1$ due to said circulatory shifting, the mark signal detecting circuit MD generates an output as the result of detecting said start code F to reset the ring counter RC, thereby shutting off the space code S from the positions of the digits $D_1$ to $D_3$ of the supplementary shift register $SR_2$. Accordingly, there is formed a path of circulatory shifting between the position of the digit $D_0$ of the output section and the input section of the main shift register $SR_1$, retaining the data recorded at that time. Thus is completed the writing of data 365 in the address 1.

Where data 1971 is to be further recorded in the address 3, said writing is effected by storing said data 1971 first in the buffer register BR as in the preceding case and causing the address counter to count 3. In the case of the count 1, counting is brought to an end upon detection of the start code F by the mark signal detecting circuit MD. In the case of the count 3, however, the address counter ADC further continues operation by counting down in succession until it counts 0, because there is introduced a signal derived from the detection of the space code S even after the detection of the start code F.

There is now described the case of reading out stored data. Where there is to be read out the data stored, for example, in the address 1, then the address counter ADC is first made to count 1. A signal of readout instructions MO generated at this time is conducted as a gate signal to an AND circuit $A_9$ connected to the input section of the buffer register BR, as well as to an AND circuit $A_{10}$. Where, under this condition, the space code S remains at the position of the digit $D_0$ of the final output section of the main shift register $SR_1$, the AND circuit $A_{10}$ is opened by an output from the mark signal detecting circuit MD to reset the flip-flop circuit $FF_1$ through the OR circuit $O_7$. Where, however, the start code F arrives at the posijion of the digit $D_0$ of the final output section of the main shift register $SR_1$, the AND circuit $A_{10}$ is closed, and the AND circuit $A_3$ is opened which is supplied with said readout signal MO, causing the address counter ADC to count down through the AND circuit $A_4$. when it counts 0 through the above-mentioned operation, the address counter ADC produces an output of "1," which is supplied to the flip-flop circuit $FF_1$ to set it. Where the start code F is introduced into the input section of the main shift register $SR_1$ and the least significant digit of the stored data 365 is brought to the position of the digit $D_0$ of the final output section of the main shift register $SR_1$, then an output signal of "1" of the flip-flop circuit $FF_1$ is conducted to the AND circuit $A_9$. and the least significant digit 5 conducted to said $D_0$ position is brought back to the buffer register BR through the AND circuit $B_0$, OR circuit $O_3$, AND circuit $A_1$ and AND circuit $A_9$. Thus with the progress of shifting effected by clock pulses, the data 365 is introduced into the buffer register BR through the readout operation. In this case, data obtained from the $D_0$ position passes through the adder ADD to be shifted also through the main shift register $SR_1$, thereby retaining the data stored at that time. Upon completion of the aforesaid readout operation, the mark signal detecting circuit MD again detects the space code S brought to the position of the digit $D_0$ of the final output section of the main shift register $SR_1$ to reset the flip-flop circuit $FF_1$, restoring the original stored data making circulatory shifting.

There will now be described the case where there is added fresh data 721 to the stored data 365. As in the case of writing, said fresh data 721 is first recorded in the buffer register BR and the address counter ADC is set at 1. Where, under this condition, there is introduced a signal of writing instructions MI, and the start code F is brought to the position of the digit $D_0$ of the final output section of the main shift register $SR_1$, then the AND circuit $A_3$, and the AND circuit $A_4$ produce an output to cause the address counter ADC to count down to set the flip-flop circuit $FF_1$. Where, under this condition, the start code F arrives at the input section of the main shift register $SR_1$, the AND circuit $A_4$ again generates an output to open the AND circuits $A_5$ and $A_6$, thereby delivering the data stored in the buffer register BR to the adder ADD. Though, in this case, the input value detecting circuit BRD produces an output of $Y$=1, the flip-flop circuit $FF_2$ is not set and the AND circuit $A_1$ remains open, because there are already brought the start code F and the data 365 to the output section of the main register $SR_1$. Upon impression of clock pulses, therefore, the data 365 stored in the main shift register $SR_1$ is added to the adder ADD, starting with the least significant digit 5, so as to be added to the data 721 already brought to the adder ADD from the buffer register BR. In thise case, addition of 365 and 721 results in a 4-bit number of 1086. When the third digits 3 and 7 are added together, the adder ADD produces a carry signal, which in turn is supplied to the input value detecting circuit BRD. Thus even when the buffer register BR is fully emptied of data stored therein, said carry signal causes the input value detecting circuit BRD to retain a state of $Y$=1 up to the fourth digit. When the third digit stored in the main shift register $SR_1$ is supplied to the adder ADD, the space code S is brought to the position of the digit $D_0$ of the final output section of the main shift register $SR_1$ and the mark signal detecting circuit MD generates an output as the result of detecting said space code S. Accordingly, the flip-flop circuit $FF_2$ is set to bring circulatory shifting to an end with the AND circuit $A_1$ shut off.

When the fourth digit of the four-digit sum 1086 is going to be stored in the main shift register $SR_1$ the least significant digit 6 thereof overflows to the supplementary shift register $SR_2$. The ring counter RC is operated in the same manner as in writing to open the AND circuit $B_1$. Where the carry signal is extinguished, the input value detecting circuit BRD generates an output of $Y=0$ to reset the flip-flop circuits $FF_1$ and $FF_2$, giving rise to circulatory shifting. Where, therefore, the start code F is brought to the position of the digit $D_0$ of the final output section of the main shift register $SR_1$, the ring counter RC is reset.

The foregoing embodiment refers to the case where a memory device was operated with serial 4-bit signals. However, this invention is not limited to this number of bits, but may also enable a memory device to be operated with serial 5-bit signals or parallel *n*-bit signals.

I claim:

1. A memory device comprising:

a buffer register for storing input data;

a main shift register for storing in specified addresses input data from said buffer register in the form of serially arranged words by use of word dividing codes inserted into each address;

a supplementary shift register serially connected to said main shift register for temporarily storing excess digits when the input data from said buffer register has more digits than those already registered in the addresses of said main shift register, the already registered digits corresponding to the storage capacity of said main shift register;

by-pass means for feeding back data of said excess digits registered in said supplementary shift register to an input terminal of said main shift register when input data from said buffer register has been fully filled in the addresses of said main shift register; and disconnecting means coupled to said by-pass means for disconnecting said supplementary shift register from said main shift register by rendering said by-pass means inoperative in a particular timing corresponding to each cycle of circulatory shifting in said main shift register.

2. A memory device according to claim 1 wherein said by-pass means comprises a ring counter for counting digits and AND circuits coupled thereto, said AND circuits being responsive to the outputs from said ring counter and outputs corresponding to said excess digits from said supplementary shift register to form gate input signals.

3. A memory device according to claim 1 wherein said disconnecting means comprises a mark signal detecting means comprises a mark signal detecting means coupled to said main shift register and adapted to render said by-pass means inoperative responsive to detection of a given mark signal.

4. A memory device according to claim 1 wherein said by-pass means includes means responsive to detection of at least a start code in the stored data to render said bypass means inoperative.

* * * * *

UNITED STATES PATENT OFFICE
CERTIFICATE OF CORRECTION

Patent No. 3,771,133 Dated November 6, 1973

Inventor(s) Toshio KASHIO

It is certified that error appears in the above-identified patent and that said Letters Patent are hereby corrected as shown below:

Column 8, lines 21 and 22, delete "comprises a mark signal detecting means".

Signed and sealed this 4th day of June 1974.

(SEAL)
Attest:

EDWARD M.FLETCHER,JR.
Attesting Officer

C. MARSHALL DANN
Commissioner of Patents